| United States Patent [19] | [11] | 4,237,147 |
|---|---|---|
| Merten et al. | [45] | Dec. 2, 1980 |

[54] STABILIZED AMORPHOUS CALCIUM CARBONATE

[75] Inventors: Helmut L. Merten, Ladue; Gerald L. Bachman, Kirkwood, both of Mo.

[73] Assignee: Monsanto Company, St. Louis, Mo.

[21] Appl. No.: 431,002

[22] Filed: Jan. 4, 1974

Related U.S. Application Data

[62] Division of Ser. No. 112,446, Feb. 3, 1971, abandoned.

[51] Int. Cl.$^3$ .............................................. A23L 2/40
[52] U.S. Cl. ............................ 426/590; 252/188.3 R; 423/430; 426/591
[58] Field of Search ............... 252/188.3 R; 423/432, 423/430, 165, 158, 419; 424/44; 426/191, 591, 561, 590

[56] References Cited

U.S. PATENT DOCUMENTS

| 2,188,663 | 1/1940 | McClure et al. ..................... 423/432 |
| 2,851,360 | 9/1958 | Diller .................................. 426/191 |
| 2,851,361 | 9/1958 | Diller .................................. 426/191 |
| 3,328,173 | 6/1967 | Van Ness et al. ................... 426/191 |
| 3,527,702 | 9/1970 | Holluta et al. ...................... 423/432 |
| 3,576,644 | 4/1971 | Anderson et al. ................... 426/191 |
| 3,649,298 | 3/1971 | Krepvoy et al. ..................... 426/191 |
| 3,667,962 | 6/1972 | Fritzberg et al. .................... 426/591 |

*Primary Examiner*—Kenneth M. Schor
*Attorney, Agent, or Firm*—Robert E. Wexler

[57] ABSTRACT

Stabilized amorphous calcium carbonate which is useful as a carbonate factor in effervescent compositions. Process for preparing stabilized amorphous calcium carbonate and compositions containing stabilized amorphous calcium carbonate.

8 Claims, No Drawings

STABILIZED AMORPHOUS CALCIUM CARBONATE

This is a division of application Ser. No. 112,446, filed Feb. 3, 1971, now abandoned.

This invention relates to calcium carbonate which is useful as a carbonating agent, to processes therefor and effervescent compositions containing same.

The reaction of acidic compositions, hereinafter referred to as the "acid factor," with bicarbonate or carbonate-containing compositions, hereinafter referred to as the "carbonate factor," in an aqueous environment, such as a solution, to produce or release carbon dioxide is well known in the art and will hereinafter be referred to as the "effervescent reaction." The effervescent reaction has heretofore been utilized in many fields, such as the food and medicament industries, where a rapid release of carbon dioxide at a controlled point in time is desirable.

Products that undergo the effervescent reaction upon use normally comprise a dry, solid mixture of an acid factor and a carbonate factor, said mixture being hereinafter referred to as an "effervescent composition." The acid factor and the carbonate factor in the effervescent compositions are normally dry solids and are water soluble, at least in the presence of each other. Additionally, the acid and carbonate factors utilized mush be compatible with their intended use, i.e., if to be consumed, they must be physiologically acceptable.

Many such effervescent compositions have been provided commercially. For instance, it is known that an effervescent composition of citric acid, sodium bicarbonate (in less than the stoichiometric equivalent of citric acid) and a flavor will provide a carbonated beverage upon adding the composition to the proper amount of water. Other examples of effervescent compositions are the well-known effervescent medicament tablets, baking sodas and the like. The major advantage of these products is, of course, that the effervescent composition may be easily and economically stored as a dry solid and may then be used, as desired, by merely contacting it with water to produce a carbonated beverage, i.e., the release of carbon dioxide.

The food industry has long sought commercially feasible products to provide a carbonated beverage from an effervescent composition. Such a beverage must be highly palatable and, as a practical matter, must afford a rapid rate of preparation by the consumer. Normally, the consumer expects to be able to prepare the beverage in a short time, i.e., within about one to three minutes at the most. It is essential, therefore that the effervescent composition rapidly undergo the effervescent reaction upon contact with water providing a carbonated beverage that is highly palatable to the consumer.

Although many acid factors are available, such as citric acid, fumaric acid, adipic acid, malic acid, tartaric acid, etc., the primary carbonate factor heretofore utilized in effervescent compositions has been sodium bicarbonate. Sodium bicarbonate is highly reactive with acid factors in aqueous solutions, rapidly releasing carbon dioxide, and has become the standard carbonate factor utilized by industry in effervescent compositions. Other carbonate factors, such as calcium carbonate and magnesium carbonate have been suggested as possible alternatives, but to date only sodium bicarbonate has been able to provide the desired rate of carbon dioxide release. Sodium bicarbonate does, however, have a major drawback, particularly in the food and medicament industries, in that it gives a distinctly disagreeable saline or soapy taste to the solutions containing it, which is known to be due to the presence of the sodium ion. Accordingly, many attempts have been made to substitute a more agreeable tasting cation in the carbonate factors utilized in effervescent compositions.

A cation that provides excellent taste characteristics in aqueous solutions or compositions containing it is the calcium ion. Although calcium carbonate and compositions containing it have been heretofore suggested as carbonate factors for effervescent compositions, they have not been utilized in commercial products due primarily to the slow rate of carbon dioxide release they display in the effervescent reaction. For instance, it takes the calcite state of calcium carbonate from about ten to about fifteen times the length of time required for an equivalent amount of sodium bicarbonate to release the total available carbon dioxide in a given acidic aqueous solution. Although several crystalline states of calcium carbonate are known such as the heretofore mentioned calcite and others such as aragonite and vaterite, none have been known to possess the requisite rate of carbon dioxide release for commercially feasible use in effervescent compositions. It is obvious, therefore, that a carbonate factor that contains calcium carbonate and that will rapidly undergo the effervescent reaction would be most welcome by those skilled in the art. Prior workers in this field have been unable to provide such a carbonate factor.

It is an object of the present invention to provide such a carbonate factor.

It is also an object of the present invention to provide a process for producing calcium carbonate that can be readily utilized as a carbonate factor in effervescent compositions.

Furthermore, it is an object of the present invention to provide effervescent compositions that contain such a carbonate factor.

These and other objects and advantages will be apparent from a consideration of the following description of the invention.

Accordingly, this invention provides stabilized amorphous calcium carbonate.

STABILIZED AMORPHOUS CALCIUM CARBONATE

For purposes of this discussion the term "amorphous" shall mean that morphological state of a material that does not show a crystalline state upon analysis by the known means of investigating a material's morphological state. For instance, a material is considered to be amorphous if it does not show any X-ray pattern upon X-ray analysis and shows only one refractive index upon subjecting the material to refractive index analysis.

For purposes of this discussion the term "stabilized" means that the amorphous material under consideration will remain essentially in the amorphous state for significant periods of time, i.e., for at least one month and longer when stored in a closed container.

Amorphous calcium carbonate has been reported in several sources [Louisfert, J. et al., Compt. rend. 235,287 (1952) and Gillott, J. E., J. Appl, Chem. 17, 185 (1967)]. Gillot states that carbonate of $Ca(OH)_2$ may result in the formation of synthetic amorphous calcium carbonate which crystallizes to calcite in the presence of moisture at room temperature. Our experience with amorphous calcium carbonate agrees with Gillott's findings. We have found, however, that stabilized amorphous calcium carbonate is more resistant to calcite crystal formation than previously known amorphous calcium carbonate.

It has been found that stabilized amorphous calcium carbonate has an infra-red spectrum quite similar to that obtained with the known crystalline states of calcium carbonate but distinguishable in that stabilized amorphous calicum carbonate gives a spectrum wherein the peaks obtained are significantly broader than those obtained with the known crystalline states of calcium carbonate.

Furthermore, examination under the electron microscope reveals a significant difference between stablized amorphous calcium carbonate and the known crystalline states of calcium carbonate (calcite, aragonite and vaterite). Calcite crystals appear as well formed cubes uniform in size. Crystals of vaterite occur as spheres of different size while those of aragonite form fairly uniform needles. In contrast, particles of stabilized amorphous calcium carbonate have no distinct size or shape at the same magnification. Further magnification reveals that stabilized amorphous calcium carbonate has a rough surface and non-uniform size suggesting an agglomerate of smaller particles. Still further magnification shows extremely small, substantially spherical particles with an average particle size of from about 10 A° to about 340 A° at the edge of larger, irregularly-shaped agglomerates. Upon subjecting stabilized amorphous calcium carbonate to X-ray analysis no X-ray pattern is obtained. These results indicate that, in fact, stabilized amorphous calcium carbonate is "amorphous".

The amorphous state of stabilized amorphous calcium carbonate was further confirmed by refractive index determinations. It was found that not only is stabilized amorphous calcium carbonate clearly isotropic but that it gives refractive indices that are distinctly different from the refractive indices found with other amorphous calcium carbonate and the known crystalline states of calcium carbonate.

Stabilized amorphous calcium carbonate is useful wherever small particle calcium carbonate has heretofore been found useful. Furthermore, stablized amorphous calcium carbonate is extremely useful as a carbonate factor in effervescent compositions. Therefore, this invention also provides excellent effervescent compositions comprising an acid factor and stabilized amorphous calcium carbonate.

A PROCESS FOR PREPARING STABILIZED AMORPHOUS CALCIUM CARBONATE

A process for the preparation of stabilized amorphous calcium carbonate comprises (1) forming an aqueous solution of calcium ions and a hydrogen-bonding material, (2) contacting the solution with carbon dioxide while maintaining the solution at a temperature below about 15° C. to form a precipitate containing chemically-bound water, and (3) reducing the amount of chemically-bound water contained in the precipitate to below about 15% by weight while maintaining the resulting composition in an environment that is essentially free of unbound water.

The term "hydrogen-bonding material" as utilized herein means a material or combination of two or more materials that form hydrogen bonds in aqueous solutions. The hydrogen-bonding material must be an organic material whose molecule contains at least one oxygen or nitrogen atom that is capable of bonding hydrogen in another part of the same molecule or in some other molecule. Furthermore, the hydrogen-bonding material must be water-soluble at the temperatures contemplated for the precipitate-forming step of the process of the present invention. It may occur that the hydrogen-bonding material is not completely water-soluble per se in the formation of the aqueous solution but will go into solution as the precipitate-forming step proceeds; these materials are also within the scope of the present invention. Examples of hydrogen-bonding materials include all the mono-, di-, tri- and oligo- saccharides which are water-soluble such as sucrose, glucose, fructose and mannose, or saccharide derivatives of the hydrocolloid-type such as gum arabic, guar gum, propylene glycol, alginate, carrageen; the alcohols and polyhydric materials which are water-soluble such as methanol, ethanol, propanol, sorbitol and glycerine, the amino acids which are water-soluble, including optically active and inactive materials and polymeric amino acids (peptides), such as glycine and lysine, aspartic acid, phenylalanine and the dipeptide esters thereof such as the methyl ester of L-aspartyl-L-phenylalanine; the carboxylic and hydroxycarboxylic acids such as glycolic, acetic, tartaric and lactic acid. The preferred hydrogen-bonding materials are the saccharides due to their ready availability and usefulness in products to be consumed.

The concentration of the hydrogen-bonding material in the aqueous solution to be utilized in the present invention can generally be in the range of from about 2% up to about 95% by weight of the total solution. Although it is possible to carry out the process at lower and higher levels of hydrogen-bonding materials, it has been found that the range of from about 10% up to about 45% by weight is the most practical from a commercial operation point of view. However, it should be understood that, depending on the particular hydrogen-bonding materials selected, the concentration can be varied widely to obtain the desired results. For instance, excellent results have been obtained with a glycine concentration as low as about 10% whereas, with methanol, a concentration of about 90% has been found to give excellent results.

In determining the proper amount of hydrogen-bonding material to be utilized the physical effects of the hydrogen-bonding material in the aqueous solution should be considered. For instance, the aqueous solution should not contain so high a concentration of hydrogen-bonding material so as to form a solution that is so viscous as to present problems such as poor heat transfer, poor mixing, etc. The preferred amount hydrogen-bonding material in the aqueous solution is in the range of from about 10% to about 30% by weight of the total solution. It has been foun that when sucrose is utilized within this range excellent results have been obtained with the process of this invention.

The first step of the process of this invention comprises the formation of an aqueous solution of calcium ions and the hydrogen-bonding material. The concentration of calcium ions in the solution should be in the range of from about 0.01% to about 23% by weight of the solution and preferably from about 1% to about 10%. Although, as a practical matter, this latter range is preferred, the process can in fact be carried out at lower levels of calcium ion concentration, dependent only on the payload desired, whereas the higher levels are dependent on the amount of calcium ion that can be placed in solution which is, in turn, somewhat dependent upon the hydrogen-bonding material utilized and the temperature at which the aqueous solution is formed.

Although there are a number of different ways to form the aqueous solution containing calcium ions and hydrogen-bonding material, this is not a critical aspect of the present invention and many different methods may be utilized to form this solution. For instance, the aqueous solution may be formed by dissolving such calcium-containing materials as calcium oxide, calcium hydroxide, calcium hydride, calcium peroxide or other water-soluble calcium salts such as calcium chloride, etc. in either (a) water, and thereafter dispersing the hydrogen-bonding material therein, or in (b) an aqueous solution already containing the hydrogen-bonding material. It is also possible to utilize calcium metal to provide the calcium ions in the aqueous solution by contacting it with water, although this is somewhat impractical.

It is, of course, also possible to form the aqueous solution by admixing an aqueous solution of the calcium-containing material with an aqueous solution of the hydrogen-bonding material or any other such modifications thereof as long as the resulting aqueous solution has the proper concentration of calcium ions and hydrogen-bonding material.

The water used for forming the aqueous solution can be either distilled water or tap water as long as an undue amount of hardness is avoided.

The temperature at which the solution is formed is not critical to the process of this invention, but is is preferably below about 70° C., so as to avoid any adverse conversion of the hydrogen-bonding material, such as, for instance, the inversion of sucrose. In particular, it has been found that excellent results can be obtained by forming the solution at ambient temperatures. Moreover, it has been found that when the hydrogen-bonding material is sucrose, the lower the temperature of the aqueous solution, the higher the level of calcium ion concentration that can be provided in the solution which is, of course, particularly advantageous to the process of the present invention due to superior payloads per unit weight of aqueous solution.

Although insoluble impurities sometimes found in the aqueous solution of calcium ions and hydrogen-bonding material do not significantly affect the process of this invention, they can end up in the resulting product as an impurity and result in a decreased reactivity of the stabilized amorphous calcium carbonate when it is utilized as a carbonate factor in an effervescent composition. It is preferred, therefore, that the solution be filtered, centrifuged or otherwise treated so as to remove most, if not all, of the insoluble impurities found in the solution. Furthermore, it is preferred to form a solution in the first step of the process of this invention that is "clear", i.e., transparent, as opposed to an opaque solution. This results in products that are substantially superior in their functionality in the effervescent reaction.

In regard to the removal of insoluble impurities, there is a lower limitation on the temperature of the solution when removing the insoluble impurities because it has been found that the lower the temperature of the solution the slower the rate of removal, such as by filtration, and therefore the longer the time required for removing the insolubles. Because it has been found that the calcium ion concentration in the solution can be increased at lower temperatures with some hydrogen-bonding agents, this lower limit on the temperature at which removal of insolubles should take place will have to be balanced against the desirability of improving or increasing the calcium ion concentration. In general, it is preferred to remove most of the insoluble impurities from the solution at lower temperatures; that is, at as low a temperature as is possible wherein the insoluble impurities will be at a minimum, due to the higher solubility of calcium-containing materials at lower temperaures, without requiring an undue amount of time for removal. The insoluble impurities mentioned hereinabove may be excess calcium oxide, other calcium-containing materials such as calcium hydroxide, calcium carbonate, and many of the other insoluble salts that are found normally as an impurity in calcium-containing materials.

Once the aqueous solution of calcium ions and hydrogen-bonding material has been formed, the second step, which will herein be referred to as the "precipitate-forming step", consists of contacting the resulting solution with carbon dioxide in order to form a precipitate.

In general, it has been found that if the precipitate-forming step is carried out at lower temperatures, the stabilized amorphous calcium carbonate obtained has faster rates of reactivity in effervescent reactions.

Therefore, it should be noted here that the temperature of the aqueous solution during the precipitate-forming step should, in general, be maintained below about 15° C. down to as low as about the freezing point of the aqueous solution in order to obtain the more reactive products of this invention. Furthermore, it has been found that the temperature maintained in the aqueous solution during the precipitate-forming step affects the reproducibility of the desired products of this invention. Although the reasons for such an effect are not known, it has been found that the reproducibility of such products is greatly improved at the lower temperatures. Accordingly, it is preferred that the temperature of the aqueous solution in this precipitate-forming step be below about 10° C., and further preferred that the temperature be from about −5° C. to about +5° C. and still further preferred that the temperature of the solution be from about −3° C. to about 0° C.

In regard to the temperature of the aqueous solution while the precipitate-forming step is being carried out, it has been observed that the presence of ice in the aqueous solution will assist in the maintaining of the proper temperature of the aqueous solution and also appears to assist in the formation of an excellent product. Although a good product is obtained without the presence of ice, it should be noted that the presence of ice in the aqueous solution will improve the product obtained from the process of this invention.

The aqueous solution containing the hydrogen-bonding material and calcium ions is brought to the proper temperature and maintained at that temperature while contacting it with carbon dioxide. The carbon dioxide may be in the form of a gas or a solid or may be introduced on the surface of the solution, sub-surface, or even contacted in a counter-current fashion. The preferred method of contacting is subsurface to provide both intimate contact and good agitation. Carbon dioxide may also be introduced in conjunction with other gases, such as a converter gas, as long as the other gases are inert.

Sufficient agitation of the aqueous solution should be provided so that the temperature of the solution at any particular location in the aqueous solution does not rise above about 15° C. (i.e., to prevent localized "hot spots").

In carrying out the precipitate-forming step, the aqueous solution must, at the outset, be in a basic or alkaline state to form a precipitate. The pH will decrease as the precipitation takes place. It has been found that this alkaline pH condition is necessary to obtain stabilized amorphous calcium carbonate. This alkaline state can ordinarily be obtained by utilizing those forms of calcium that will form basic or alkaline solutions upon contact with water but it can also be obtained by incorporating alkaline materials in the aqueous solution.

The carbon dioxide should be introduced into the aqueous solution until no further carbon dioxide is taken up. (The carbon dioxide can continue to be introduced but it has no further effect on the aqueous solution). If the aqueous solution evolves carbon dioxide (other than the normal carbon dioxide evolving from a carbon dioxide saturated aqueous solution) then the aqueous solution should be allowed to equilibrate until substantially all of the carbon dioxide has evolved.

The precipitate formed in the precipitate-forming step is a form of calcium carbonate that contains a large proportion by weight, based on the weight of the precipitate, of chemically-bound water and also contains a hydrogen-bonding material.

This precipitate must then be treated to reduce the amount of chemically-bound water contained in the resulting precipitate to below about 15% or, in other words, to cause a "dehydration" of the precipitate. It is critical that the dehydration be carried out in a manner such that the resulting composition is maintained in an environment that is essentially free of unbound water. By this statement it is meant that, to provide the products of the present invention by proper dehydration, means must be provided to substantially avoid contacting the resulting composition with water that is in a free state; either water from the aqueous solution or water that has been released from the precipitate. It has been found that the novel products of this invention can only be provided in this manner.

Several methods have been developed to carry out the dehydration. One of these methods comprises isolating the precipitate from the aqueous solution by recovering the precipitate from the solution and washing it with a volatile organic solvent and subsequently dehydrating the precipitate in an environment that facilitates a substantially instantaneous removal of a portion of the chemically-bound water from the remaining composition once the water has been released from its chemically-bound form in the precipitate. This method is described in greater detail as follows.

Once the precipitate-forming step of the process of this invention has been completed, the precipitate can be recovered from the aqueous solution. Recovery can be carried out by any of the usual means of recovering a solid from a liquid containing it, such as, by filtration, centrifugation or sedimentation, etc., resulting in a cake of the precipitate with some of the aqueous solution adhering to it.

The recovered cake can then be washed free of the aqueous solution by solvent displacement with a water-miscible organic solvent so as to remove the last traces of any remaining aqueous solution that may be adhering to the particles of the precipitate. The preferred water-miscible organic solvents to be utilized in washing the cake are the lower alkyl alcohols, such as methanol, ethanol or isopropanol; or the ketones, such as acetone that can be readily removed from the precipitate by drying at low temperatures. This results in a material that is free of any of the aqueous solution from which it was formed.

It has been found that some organic solvents will not only remove the aqueous solution adhering to the precipitate cake but will also cause some portion of the chemically-bound water to be removed. This is not only not detrimental but is desirable as it requires less dehydration of the resulting isolated precipitate without adversely affecting the resulting end product.

During recovery and washing it is preferred to maintain the precipitate at low temperatures until the cake is substantially free of the aqueous solution. It is preferred to conduct the isolation, including the solvent displacement or washing portion, at temperatures below about 15° C. and preferably at temperatures below about 10° C. and particularly preferred at temperatures of from about −5° C. to about +5° C. This provides excellent products of this invention.

The temperatures utilized in removing the water-miscible solvent from the precipitate may vary somewhat depending on the particular organic solvent utilized for washing the precipitate without adverse effects in the resulting products. For instance it has been found that, when utilizing methanol, a temperature up to about 40° C. can be used whereas with acetone and ethanol a temperature higher than about 5° C. can cause adverse effects in the resulting products.

After washing with the organic solvent, it has been found that the water now remaining in the precipitate is chemically-bound rather than merely adhering to the precipitate particles and is a large part by weight of the precipitate.

The precipitate must then be treated to reduce the amount of chemically-bound water contained therein to below about 15% so as to provide stabilized amorphous calcium carbonate. The reduction of the amount of chemically-bound water in the resulting precipitate is accomplished by treating the precipitate in a particular manner for removal of the chemically-bound water and should be clearly distinguished from the isolation of recovery of the precipitate from the aqueous solution as previously described. In particular, the precipitate as isolated above must now be treated in an environment that facilitates the substantially instantaneous removal of a portion of the chemically-bound water from the remaining composition once the water has been released from its chemically-bound form in the precipitate. In other words, there is a twofold effect required that comprises (a) causing a portion of the chemically-bound water to be released from the combination in which it is bound, while (b) substantially instantaneously removing the water so released from the resulting composition.

The dehydration can be carried out by various means and in many types of equipment. For instance, it has been found that excellent dehydration results are obtained by treating the solvent washed and dried precipitate in vacuum ovens, fluid bed dryers, and, although the length of time required is increased, even dehydration by air drying in low humidity conditions. In each of these procedures the solvent washed and dried precipitate is treated so as to cause a portion of the chemically-bound water to be released while substantially instantaneously removing the water from the surrounding composition as it is released. Dehydration should be continued until the amount of chemically-bound water remaining in the resulting composition is less than 15% by weight. While the chemically-bound water content can be reduced to as low as about 0.1% of the resulting composition the dehydration is preferably stopped when the chemically-bound water content is from about 2% to about 5% by weight of the composition.

The undehydrated precipitate, after isolation from the solution in which it was formed and whether solvent washed or not, is a soft, friable semi-solid. When properly dehydrated it retains this friable condition but becomes harder and more solid. If not properly dehydrated, i.e., the water is not removed rapidly enough, the soft, friable semi-solid loses its shape and becomes a slurry. Drying the slurry results in a hard, brittle, chalk-like solid which is apparently the calcite crystalline state of calcium carbonate which does not have the desired rate of reactivity in the effervescent reaction. This undesirable effect will be hereinafter referred to as "decomposition."

In another illustrative embodiment of the dehydration portion of the process of the present invention, it has been found that dehydration can be carried out in the following manner. This embodiment consists of forming a cold aqueous slurry of the precipitate formed in the precipitate-forming step of the process of this invention and spray drying the slurry.

One way of preparing the cold aqueous slurry is by separating the major portion of the aqueous solution, in which the precipitate was formed, by such means as filtration, centrifugation, sedimentation, etc., leaving a wet cake which has adhering to it a small amount of aqueous solution and subsequently slurrying the wet cake in cold water.

Alternatively, less of the aqueous solution can be separated from the precipitate leaving a cold aqueous slurry of the precipitate in the aqueous solution. The degree of separation of the aqueous solution from the precipitate will depend on the desirability of recycling the aqueous solution back through the first step of the process of this invention so as to avoid undue use of the hydrogen-bonding material balanced against the economics of providing cold make-up water to reslurry the cake. The cold aqueous slurry formed may even be a compromise between the two above illustrations wherein the aqueous solution is not separated enough to form a cake of the precipitate but cold water is added, nevertheless, to provide the slurry desired. In any case, the resulting slurry should be maintained at all times during formation and until drying below about 15° C. so as to avoid adverse effects on the resulting product.

The cold aqueous slurry is then spray dried while maintaining the spray dryer at conditions sufficient to rapidly dry and dehydrate the slurry and precipitate that is being introduced into the spray dryer at below about 15° C.

It has been found that this embodiment of the process of the present invention will result in a combination of completing the isolation of the precipitate from the aqueous solution in which it was formed and at the same time causing the release of chemically-bound water while substantially instantaneously removing the water so released. This portion of the process of this invention is thereby simplified and improved resulting in less preparation time. Furthermore, this procedure eliminates the necessity of washing the precipitate with a water-miscible solvent.

It is to be noted that the effect on the precipitate using spray drying is essentially the same as previously disclosed. That is, the action of the spray dryer removes the remaining aqueous solution from the precipitate which, in essence, completes the isolation as previously described and, concurrently, the spray drying causes a release of most of the chemically-bound water from the precipitate while causing the substantially instantaneous removal of the water so freed from the surrounding composition. It has been found that the resulting chemically-bound water in the product is within the preferred range of chemically-bound water content.

It should be understood that the products of this invention while having the desirable characteristics previously described can also have some of the undesirable properties of materials of the prior art due to partial decomposition apparently due to conditions maintained during the dehydration step.

A test was developed to measure the reactivity of various calcium carbonates which is as follows: 200 milliliters of distilled water is mixed with 5.0 milliliters of 1.0 normal citric acid solution to form a solution that contains 5 milli-equivalents of citric acid. The pH of this citric acid solution is 2.6 as measured on a Leeds and Northrup pH meter with expandable scale (the full scale deflection is 2 pH units). The pH meter is connected to a Leeds and Northrup recorder with a 6.5 inch width chart and a speed equivalent to 8 inches per minute and adjusted so that full scale deflection is 2 pH units. The electrodes of the pH meter are immersed in the citric acid solution and the beaker containing the solution is placed on a magnetic stirrer. The stirrer is adjusted to approximately 125 rpm. The pH meter is adjusted to 0 deflection (the recorder is therefore also at 0 deflection). The recorder chart is activated. A 0.18 gram sample of the calcium carbonate to be tested is then added to the beaker. The pH of the solution, as recorded on the recorder, will increase until all of the calcium carbonate has reacted and the reaction is considered to be complete when the pH of the solution no longer increases. By determining the point at which the pH no longer increases, the length of time required for a particular sample of calcium carbonate to react can be observed.

Utilizing this reactivity test, the "reactivity" of various calcium carbonates can be determined. It has been found that those calcium carbonates that have a reactivity time of less than one minute, when measured by the above test, will provide carbonate factors for effervescent compositions that are extremely useful in that they are capable of supporting extremely rapid effervescent reactions upon use. This process of the present invention will provide such calcium carbonates.

During the investigations which resulted in the present invention it was found that some calcium carbonates prepared, although initially possessing this desirable characteristic of rapid reactivity, would lose their rapid reactivity after periods of storage. It was found that, in contact with saturated air, many such rapidly reactive calcium carbonates quickly lose their rapid reactivity. A lower degree of saturation or relative humidity resulted in a slower loss in the rapid reactivity. Those samples that were stored under low humidity conditions retained their rapid reactivity for longer periods of time.

It was found that the most severe conditions of storage for such calcium carbonates is storage in a small sealed container (i.e. with very little air space). This is apparently due to the fact that the sample has only to give up a very small amount of water to saturate the air in the container. (Saturated air at 22.2° C. contains 0.0002 grams water vapor/cc.)

In order to determine the "storability" of various rapidly reactive calcium carbonates including those of the present invention the following test was developed. Weigh 2.0 g of a sample into a 1 oz. glass bottle and seal with a cap. Store the bottle and contents at room temperature (20°–25° C.). At the end of one month storage measure reactivity by the above described test. If the "reactivity" increases more than 5% in this test the sample tested does not have an acceptable storability.

In general, we have found that a chemically-bound water content in stabilized amorphous calcium carbonate of below about 5% is desired for good storability. However, it has been found that the storability of the materials of this invention is not solely dependent on the chemically-bound water content. Materials have been prepared containing as much as 15% chemically-bound water which have been found storable for greater than 3 months and other materials containing only 2% water were found to be nonstorable in less than one month.

It is preferred, however, that stabilized amorphous calcium carbonate have a water content of no more than about 5% to have a reasonably predictable and acceptable storability.

The process of the present invention will be more readily understood by reference to the following examples, of which Example 1 is a general procedure, which are understood not to limit the present invention, but to be construed broadly and be restricted solely by the appended claims. In these examples the water content of the dehydrated precipitate refers to chemically-bound water content. Unless otherwise noted in these examples, analyses of the products resulting from the following procedures show the presence therein of the hydrogen-bonding material utilized.

EXAMPLE 1

In a suitable vessel, an aqueous solution of calcium ions and sucrose is prepared. The preferred amount of sucrose in the aqueous solution is from about 10% to about 30% by weight of the solution. The concentration of calcium ions in the solution can be from about 0.01% to about 23% by weight calcium per weight of the total solution. This solution may be formed by dispersing such calcium-containing materials as a calcium oxide, calcium hydroxide, calcium hydride, calcium peroxide or other water soluble salts such as calcium chlorides, etc., in either water and subsequently adding sucrose, or in an aqueous sucrose solution. It is preferred to add the calcium-containing material before the sucrose, and it has been found that the calcium ion solubility is increased as the sucrose concentration in the aqueous solution is increased.

It is preferred to form the calcium ions and sucrose aqueous solution by adding calcium oxide to water to form a slaked lime slurry adding sucrose to the resulting slurry. For illustrative purposes calcium oxide will be utilized in this example. The purity of the sucrose material is not critical as long as excessive amount of impurities are avoided.

The purity of the calcium oxide utilized is also not critical, but it is undesirable to have much more than a trace amount of magnesium ions associated with the aqueous solution. It is also particularly helpful in forming the solution to select the materials that have uniformly small particle sizes so as to afford a fairly rapid rate of dissolving the material.

It is preferred to obtain an aqueous solution that has both sucrose and calcium at the higher levels of the above-noted ranges due to superior yields in product per unit weight of solution.

The temperature utilized in forming the solution is not critical to the process of this invention, but it is preferably below about 70° C. so as to avoid any adverse conversion of the sucrose such as by inversion. Furthermore, it has been found that the lower the temperature of the sucrose-containing aqueous solution when adding the calcium oxide thereto, the higher the concentration of calcium ions that can be placed in solution. It is preferred to remove any insolubles remaining in the solution.

The resulting aqueous solution of sucrose and calcium ions is then contacted with carbon dioxide. The solution is at a temperature preferably of from about $-3°$ C. to about $+3°$ C., and maintained at that temperature while contacting it with carbon dioxide. The carbon dioxide is in the form of a gas and is introduced into the solution subsurface. This provides both intimate contact and good agitation. A precipitate begins to form after about 1.4 to about 1.5 moles carbon dioxide/moles calcium in the solution has been consumed and continues to form until about 1.7 to about 2.2 moles of carbon dioxide per mole of calcium has been consumed; the formation of a precipitate in this phase is exothermic. At this point, it is preferred to stop the feeding of the carbon dioxide to the solution, although the process of this invention can be carried out by continuing to feed carbon dioxide into the solution.

When the exothermic phase of the precipitate-forming step has been concluded, the solution begins to evolve carbon dioxide in an endothermic phase. If the carbon dioxide feed stream is continuously being fed to the aqueous solution, it can be observed that the amount being released from the solution is greater than the amount being added thereto. If the carbon dioxide feed stream to the aqueous solution has been stopped at the end of the exothermic phase as above-described the solution containing the precipitate will evolve carbon dioxide. In either case, this endothermic carbon dioxide-releasing phase continues until the mole ratio of consumed carbon dioxide to calcium in the solution is about 1.0 moles of carbon dioxide per mole of calcium. It is critical in the formation of the precipitate that the phases as described above be completed and, further, that the seconsd phase be continued until the point where carbon dioxide release has essentially ceased.

The precipitate is then isolated from the solution, such as by centrifugation, followed by washing with water-miscible solvent and evaporating the solvent. This procedure results in a washed precipitate that is free of any of the solution from which it was formed. Any water remaining in the precipitate is chemically-bound rather than merely adhering to the precipitate particles. The amount of this chemically-bound water must be reduced below about 15% so as to provide stabilized amorphous calcium carbonate.

The washed precipitate is then dehydrated. For instance, this can be carried out most readily in a vacuum oven at higher vacuum that continuously removes the water as it is released from its chemically-bound condition.

The resulting products are finely divided white powders that, upon subjection to the above described reactivity test, react within one minute and maintain this reactivity for at least one month storage.

EXAMPLE 2

In a suitable vessel, a mixture of 75.0 g. of calcium oxide and 225.0 g. of water was stirred at ambient temperature for 15 minutes to form a slaked lime slurry. A solution of 337.5 g. of sucrose and 937.5 g. of water was added to the slaked lime slurry and the resulting mixture was stirred 15 minutes at ambient temperature and then cooled to 5° C. Twenty grams of Dicalite Speed-Plus (filter-aid) was added and the mixture was filtered through 20 g. of Dicalite Speed-Plus. The filtrate was then cooled to 0° C. and 1000 g. of ice was added, resulting in a mixture containing 2.0% calcium and 13.1% sucrose. To this mixture was added 40 liters of $CO_2$, fed into the mixture subsurface with rapid stirring with a precipitate being formed. The resulting mixture was stirred for one hour at $-2°$ C., then warmed to $+2°$ C. and the precipitate was removed in a basket centrifuge. The precipitate cake was slurried in 700 ml. of 0° C. water (13% solids) and the slurry was spray dried at 500° F. inlet temperature (outlet temperature=300° F.). Ninety grams of product were recovered. Analysis indicated the presence of 4.9% $H_2O$. The reactivity of the product was 45 sec. and remained so over extended periods of storage.

EXAMPLE 3

In a suitable vessel, a mixture of 1300 g. of water, 300 g. of sucrose and 30 g. of calcium oxide was stirred for one hour at ambient temperature, then cooled to 5° C. Twenty grams of Dicalite Speed-Plus was added and the mixture was vacuum filtered through 20 g. of Dicalite Speed-Plus. The filtrate was then cooled to 0° C., 300 g. of crushed ice was added resulting in a mixture containing 1.1% calcium and 15.5% sucrose and 0.85 cu. ft. of $CO_2$ was fed into this mixture subsurface with rapid stirring with a precipitate being formed. The resulting mixture was stirred at $-2°$ C. for one hour and then warmed to $+1°$ C. The precipitate was removed by centrifugation and slurried 4 times with 550 ml. quantities of 5° C. acetone. After each wash the solvent was removed by vacuum filtration. The washed precipitate was dehydrated for 18 hours at 44° C. in a vacuum oven (0.45 mm.). The product obtained contained 9.1% $H_2O$, had a reactivity of 45 seconds and retained this reactivity for extended periods of storage.

EXAMPLE 4

Following the procedure of Example 2 a precipitate was prepared and centrifuged. The resulting cake (250 g.) was washed 4 times with 475 ml. quantities of 2° C. acetone. The actone was removed after each wash by vacuum filtration. The washed precipitate was dried in a fluid bed dryer at 40° C. with 5–5.5 ft.$^3$min. air flow for 60 minutes. The resulting product contained 7.5% $H_2O$, had a reactivity of 45 seconds and retained this reactivity for extended periods of storage.

EXAMPLE 5

A precipitate is prepared by the following procedure. In a suitable vessel, a mixture of 75.0 g. of calcium oxide and 225.0 g. of water was stirred at ambient temperature for 15 minutes to form a slaked lime slurry. A solution of 337.5 g. of sucrose and 937.5 g. of water was added to the slaked lime slurry and the resulting mixture was stirred 15 minutes at ambient temperature and then cooled to 5° C. Twenty grams of Dicalite Speed-Plus (filter aid) was added and the mixture was filtered through 20 g. of Dicalite Speed-Plus. The filtrate was then cooled to 0° C., 750 g. of ice was added resulting in a mixture containing 2.2% calcium and 14.5% sucrose. Forty liters of $CO_2$ was fed subsurface with rapid stirring with a precipitate being formed. The resulting mixture was stirred for one hour at $-2°$ C., then warmed to $+2°$ C. and the precipitate was removed in a basket centrifuge. Samples of the precipitate cake prepared by the above procedure were dried and/or dehydrated as follows:

A. The precipitate cake is dried "as is"—(without solvent wash).
  (1) Ten grams of cake dried in vacuum oven (National Appliance Co., inside dimensions 12"×8"×8") at 25° C. and less than 1.0 mm. for 4 hours followed by drying at 67° C. and less than 1.0 mm. for 18 hours.
    Water content—4.6%
    Reactivity—45 seconds
    Storability—excellent
  (2) Forty grams of cake dried in vacuum oven at 25° C. and less than 1.0 mm. for 2 hours followed by drying at 84° C. and less than 1.00 mm. for 18 hours.
    Water content—0.8%
    Reactivity—102 seconds
  (3) Twenty-five grams of cake dried in a forced draft oven (Blue M Electric Co., Blue Island, Illinois) at 45° C. for 20 hours.
    Water content—1.0%
    Reactivity—102 seconds
  (4) Twenty-five grams of cake dried in oven (National Appliance Co.) at 70° C. for 20 hours.
    Water content—0.8%
    Reactivity—150 seconds
  (5) Twenty-five grams of cake allowed to dry on bench at 30% relative humidity and 24° C. for 20 hours.
    Water content—1.1%
    Reactivity—120 seconds
  (6) Forty grams of cake dried in oven (National Appliance Co.) at 200° C. for 18 hours.
    Water content—0.2%
    Reactivity—165 seconds The dehydration carried out in A. (2) through (6) illustrates the decomposition of the precipitate due to improper dehydration as compared to the proper dehydration carried out in A. (1). In A. (1) a small amount of precipitate was dehydrated in a high vacuum and the resultant material had excellent reactivity and storability. In A (2) through (6) the precipitate formed a slurry during the dehydration and resulted in a hard, brittle chalk-like solid that had a low water content and a poor reactivity apparently due to not removing the free water from the precipitate being dried rapidly enough.

B. The precipitate cake (250–300 g.) is washed twice with 353 g. quantities of 0°–5° C. anhydrous acetone. Acetone removed after each wash by suction filtration. The washed precipitate was dehydrated as follows:
  (1) Two hundred grams of cake dried in vacuum oven at 25° C. and less than 1 mm. for 4 hours followed by drying at 86° C. and less than 1 mm. for 18 hours.

Water content—8.3%
Reactivity—45 seconds
Storability—excellent (2) Two hundred grams of cake dried in vacuum oven at 25° C. and 10 mm. for 4 hours followed by drying at 74° C. and 10-15 mm. for 18 hours.
Water content—0.5%
Reactivity—135 seconds (3) Twenty-five grams of cake dried in a forced draft oven at 47° C. for 20 hours.
Water content—2.1%
Reactivity—150 seconds (4) Twenty-five grams of cake dried in oven at 72° C. for 20 hours.
Water content—1.0%
Reactivity—150 seconds (5) Twenty-five grams of cake dried on bench at relative humidity and 24° C.
Water content—1.0%
Reactivity—150 seconds As in Part A. the samples dehydrated in B. (2) through (5) are examples of improper dehydration causing decomposition of the precipitate. In B (2) through (5) a slurry was formed during the dehydration step and a hard, brittle, chalk-like material resulted which had low water content and poor reactivity. On the other hand, B. (1) illustrates the proper manner of carrying out the dehydration step as no decomposition occurred and the product resulting therefrom was excellent.

C. The precipitate cake is washed twice with a 5:1 ratio (ml. solvent: g. cake) of 25° C. methanol. The solvent was removed after each wash by vacuum filtration. The washed precipitate was dehydrated as follows:

(1) Two hundred grams of cake dried in a vacuum oven at 25° C. and <2 mm. for 4 hours followed by drying at 76° C. and <2 mm. for 18 hours.
Water content—3.9%
Reactivity—45 seconds
Storability—excellent (2) Two hundred grams of cake dried in a vacuum oven at 25° C. and 7.8 mm. for
4 hours and at 63° C. and 7.8 mm. for 18 hours.
Water content—16.1%
Reactivity—45 seconds
Storability—poor (3) Twenty-five grams of cake dried in a forced draft oven at 48° C. for 20 hours.
Water content—12.7%
Reactivity—45 seconds
Storability—poor (4) Twenty-five grams of cake dried in an oven at 40° C. for 20 hours.
Water content—2.7%
Reactivity—45 seconds
Storability—excellent (5) Fifteen grams sample of cake dried on the bench at 39% relative humidity and 24° C. for 20 hours.
Water content—15.0%
Reactivity—45 seconds
Storability—excellent The samples dehydrated in Part C (2) and (3) are illustrative of a manner of carrying out the dehydration step under the proper conditions but not for a sufficient length of time, thereby resulting in products that have excellent reactivity initially but that have poor storability. C. (1), (4) and (5) are illustrative of the proper manner of carrying out the dehydration step and the product resulting therefrom.

EXAMPLE 6

In a suitable vessel, a mixture of 20.0 g. of calcium oxide and 60.0 g. of water was stirred at ambient temperature for 15 minutes to form a slaked lime slurry. A solution of 90.0 g. of sucrose and 250.0 g. of water was added to the slaked lime slurry and the resulting mixture was stirred 15 minutes at ambient temperature and then cooled to 5° C. Ten grams of Dicalite Speed-Plus was added and the mixture was filtered through 10 g. of Dicalite Speed-Plus. The filtrate was then cooled to 0° C., 240 g. of ice was added resulting in a mixture containing 2.1% calcium and 13.6% sucrose and 24 liters of $CO_2$ was fed into the mixture subsurface with rapid stirring to form a precipitate. The resulting mixture was stirred for one hour at $-2°$ C. then warmed to $+0.5°$ C. and the precipitate recovered by vacuum filtration. The resulting cake was slurried twice with 400 g. quantities of 25° C. water. The water was removed by vacuum filtration and the cake was then washed with 400 ml. of 25° C. methanol. The washed precipitate was allowed to air dry at a relative humidity of 45% and a temperature of about 24° C. for 18 hours. The resulting white solid powder had an unacceptable reactivity of 79 seconds. The product apparently changed during the water washing step and upon analysis it was determined that no sucrose was present in the precipitate.

EXAMPLE 7

In a suitable vessel, a mixture of 20.0 g. of calcium oxide and 60.0 g. of water was stirred at ambient temperature for 15 minutes to form a slaked lime slurry. A solution of 90.0 g. of sucrose and 490.0 g. of water was added to the slaked lime slurry and the resulting mixture was stirred 15 minutes at ambient temperature and then cooled to 12° C. Ten grams of Dicalite Speed-Plus was added and the mixture was filtered through 10 g. of Dicalite Speed-Plus. The filtrate containing 2.1% calcium and 13.6% sucrose was then cooled to 13° C. and 27 l. of $CO_2$ was fed subsurface with rapid stirring to form a precipitate. During this time the temperature rose to 17° C. The resulting mixture was stirred for an hour at about 15° C. and the precipitate recovered by vacuum filtration. The resulting cake was slurried twice with 400 ml. quantities of 25° C. methanol. The methanol was removed by vacuum filtration and the washed precipitate was air-dried at a relative humidity of 43% and a temperature of about 24° C. for 18 hours.

The resulting fine, white powder had a reactivity of 45 seconds and retained this reactivity during storage.

EXAMPLE 8

In a suitable vessel, a mixture of 10.0 g. of calcium oxide and 30.0 g. of water was stirred at ambient temperature for 15 minutes to form a slaked lime slurry. A solution of 50.0 g. of glucose and 300.0 g. of water was added to the slaked lime slurry and the resulting mixture was stirred and cooled to 5° C. The mixture was filtered through 10 g. of Dicalite Speed-Plus. The filtrate was then cooled to 0° C. and 200 g. of ice was added resulting in a mixture containing 1.1% calcium and 8.5% glucose. Ten liters of $CO_2$ was fed subsurface into the mixture with rapid stirring to form a precipitate. The resulting mixture was stirred for 45 minutes at $-2°$ C., then warmed to $+2°$ C., and the precipitate recovered by vacuum filtration. The resulting cake was slurried twice with 150 ml. quantities of 25° C. methanol. The methanol was removed by vacuum filtration and the washed precipitate was air dried for 24 hours at a relative humidity of 20% and a temperature of 24° C.

The resulting fine white powder contained about 15.0% water, had a reactivity of 30 seconds and retained this reactivity for extended periods of storage.

EXAMPLE 9

In a suitable vessel, a mixture of 1162.5 g. of water, 337.5 g. of glucose and 75.0 g. of calcium oxide was stirred for 1 hour at ambient temperature and then cooled to 5° C. Twenty grams of Hyflo Supercel (filter-aid) was added and the resulting mixture was vacuum filtered through 20 g. of Hyflo Supercel. The filtrate was then cooled to 0° C., 900 g. of crushed ice was added resulting in a mixture containing 2.1% calcium and 13.6% glucose and 40 liters of $CO_2$ was fed subsurface into the mixture with rapid stirring to form a precipitate. The resulting mixture was stirred at $-1°$ C. for one hour, then warmed to $+1°$ C. and the precipate was recovered in a basket centrifuge. The resulting cake was slurried in 700 ml. of 0° C. water (13 wt.% solids) and the slurry was spray dried at 500° F. inlet temperature (300° F. outlet temperature). The resulting fine white powder contained 4.7% water, had a reactivity of 30 seconds and had excellent storability over extended periods of storage.

EXAMPLE 10

In a suitable vessel, a mixture of 20.0 g. of calcium oxide and 60.0 g. of water was stirred at ambient temperature for 15 minutes to form a slaked lime slurry. A solution of 90.0 g. sorbitol and 250.0 g. of water was added to the slaked lime slurry and the resulting mixture was stirred and cooled to 3° C. The mixture was filtered through 10 g. of Dicalite Speed-Plus. The filtrate was then cooled to 0° C. and 240 g. of ice was added resulting in a mixture containing 2.1% calcium and 13.1% sorbitol and 27 liters of $CO_2$ was fed into the mixture subsurface with rapid stirring to form a precipitate. The resulting mixture was stirred for 70 minutes at $-2°$ C., then warmed to $+1°$ C. and the precipitate recovered by vacuum filtration. The precipitate cake was slurried twice with 400 ml. quantities of 25° C. methanol and twice with 400 ml. quantities of acetone. The solvents were removed by vacuum filtration and the washed precipitate was air dried 24 hours at a relative humidity of 40% and a temperature of 25° C.

The water content of the resulting product was about 17.6% and its reactivity was 45 seconds. However, the product did not retain this reactivity during storage.

EXAMPLE 11

In a suitable vessel, a mixture of 60 g. of calcium oxide and 180 g. of water was stirred at ambient temperature for 15 minutes to form a slaked lime slurry. A solution of 270 g. of sorbitol and 750 g. of water was added to the slaked lime slurry and the resulting mixture was stirred 15 minutes at ambient temperature and then cooled to 5° C. Twenty grams of Hyflo Supercel (filter-aid) was added and the mixture was filtered through 20 g. of Hyflo Supercel. The filtrate was cooled to 0° C., 720 g. of ice was charged resulting in a mixture containing 2.1% calcium and 13.6% sorbitol and 41 liters of $CO_2$ was fed into the mixture subsurface with rapid stirring to form a precipitate. The resulting mixture was stirred for one hour at $-1°$ C., then warmed to $+1°$ C. and the precipitate was recovered in a basket centrifuge. The resulting cake was slurried in 700 ml of 0° C. water (11% solids) and the slurry was spray dried at 500° F. inlet temperature, 300° F. outlet temperature.

The resulting product contained 4.4% water, had a reactivity of 50 seconds and retained its reactivity for extended periods of storage.

EXAMPLE 12

In a suitable vessel, a mixture of 10.0 g. of calcium oxide and 30.0 g. of water was stirred at ambient temperature for 15 minutes to form a slaked lime slurry. 500.0 g. of methanol was added to the slaked lime slurry and the resulting mixture containing 92.5% methanol and 1.3% calcium was then cooled to $-12°$ C. 24 liters of $CO_2$ were fed into the mixture subsurface with rapid stirring during which the temperature rose to $-5.5°$ C. and then decreased again to $-12°$ C. with a precipitate being formed. The precipitate was recovered by filtration and washed twice with 250 ml. of cold methanol. The methanol was removed by vacuum filtration. The washed precipitate was air dried for 72 hours at a relative humidity of 15% and a temperature of 24° C.

The resulting product contained 11.7% water, had a reactivity of 60 seconds and was unable to retain this reactivity upon storage.

EXAMPLE 13

In a suitable vessel, a mixture of 10.0 g. of calcium oxide and 30.0 g. of water was stirred at ambient temperature for 15 minutes to form a slaked lime slurry. A mixture of 250.0 g. of methanol and 250.0 g. of water was added to the slaked lime slurry and the resulting mixture containing 46.3% methanol and 1.3% calcium was then cooled to $-12.5°$ C. 52 liters of $CO_2$ was fed into the mixture subsurface with rapid stirring during which the temperature rose to $-8°$ C. and dropped again to $-12.5°$ C. with a precipitate being formed. The precipitate was recovered by vacuum filtration and washed twice with 150 ml. of cold methanol. The methanol was removed by vacuum filtration and the washed precipitate was air dried for 72 hours at a relative humidity of 4% and a temperature of 24° C.

The resulting product contained 2.7% water, had a reactivity of 50 seconds and retained this reactivity during extended periods of storage.

EXAMPLE 14

In a suitable vessel, a mixture of 20.0 g. of calcium oxide and 60.0 g. of water was stirred at ambient temperature for 15 minutes to form a slaked lime slurry. A solution of 90.0 g. of glycerine and 250.0 g. of water was added to the slaked lime slurry. The resulting mixture was stirred and cooled to 5° C. and was then filtered through 10 g. of Dicalite Speed-Plus. The filtrate was then cooled to 0° C. and 240 g. of ice was added resulting in a mixture containing 2.3% calcium and 15.0% glycerine and 17 liters of $CO_2$ was fed into the mixture subsurface with rapid stirring at $-4°$ C. with a precipitate being formed. The resulting mixture was warmed to 1° C. and the precipitate was recovered by vacuum filtration. The precipitate cake was slurried twice with 250 ml. quantities of 25° C. methanol and the methanol was removed by vacuum filtration. The washed precipitate was air-dried for 24 hours at a relative humidity of 25% and a temperature of 24° C.

The resulting fine white powder contained 1.3% water and had a reactivity of 45 seconds. The product

EXAMPLE 15

In a suitable vessel, a mixture of 20.0 g. of calcium oxide and 60.0 g. of water was stirred at ambient temperature for 15 minutes to form a slaked lime slurry. A solution of 45 g. glycine and 250.0 g. of water was added to the slaked lime slurry and the resulting mixture was stirred and cooled to 5° C. The mixture was filtered through 10 g. of Dicalite Speed-Plus. The filtrate was then cooled to 0° C. and 240 g. of ice was added resulting in a mixture containing 1.9% calcium and 7.3% glycine was 52 liters of $CO_2$ was fed into the mixture subsurface with rapid stirring with a precipitate being formed. The mixture was then stirred for 30 minutes at −2° C., then warmed to +1° C. and the precipitate was recovered by vacuum filtration. The precipitate cake was slurried twice with 450 ml. quantities of 25° C. methanol. The methanol was removed by vacuum filtration and the washed precipitate was air dried for 24 hours at a relative humidity of 35% and a temperature of 24° C.

The resulting product contains 17.7% water and has a reactivity of 55 seconds but did not retain this reactivity during storage.

EXAMPLE 16

In a suitable vessel, a mixture of 60 g. of calcium oxide and 180 g. of water was stirred at ambient temperature for 15 minutes to form a slaked lime slurry. A solution of 67.5 g. of glycine and 750 g. of water was added to the slaked lime slurry and the resulting mixture was stirred 15 minutes at ambient temperature and then cooled to 5° C. Twenty grams of Hyflo Supercel (filter-aid) was added and the mixture was filtered through 20 g. of Hyflo Supercel. The filtrate was then cooled to 0° C., 720 g. of ice was added resulting in a mixture containing 1.0% calcium and 3.8% glycine and 35 liters of $CO_2$ was fed into the mixture subsurface with rapid stirring with a precipitate being formed. The resulting mixture was stirred for one hour at −1° C., then warmed to +1° C. and the precipitate was recovered in a basket centrifuge. The resulting cake was slurried in 500 ml. of 0° C. water and the slurry was spray dried at 500° F. inlet, 300° F. outlet temperature.

The resulting product contained 3.7% water had a reactivity of 45 seconds and retained this reactivity for extended periods of storage.

EXAMPLE 17

In a suitable vessel, a mixture of 10 g. CaO and 30 g. water was stirred at ambient temperature for 15 minutes to form a slaked lime slurry. A solution of 25 g. lysine and 250 g. water was added to the slaked lime slurry and the resulting mixture was stirred 15 minutes at ambient temperature and then cooled to 5° C. Ten grams of filter-aid was added to the mixture which was then filtered through 10 g. of filter-aid. The filtrate was then cooled to 0° C., 240 g. of ice was added resulting in a mixture containing 0.6% calcium and 4.5% lysine and 22.5 liters of $CO_2$ was fed into the mixture subsurface with rapid stirring with a precipitate being formed. The resulting mixture was stirred for one hour at −1.5° C., warmed to 0° C. and the precipitate was recovered by vacuum filtration. The precipitate cake was slurried twice with 200 ml. of 25° C. methanol and then twice with 200 ml. of 25° C. acetone. The precipitate was removed from the solvents each time by vacuum filtration. The washed precipitate was allowed to air dry on the laboratory bench for 18 hours at a relative humidity of 35% and a temperature of 24° C.

The resulting product contained 11.7% water and had a reactivity of 33 seconds but did not retain this reactivity during storage.

EXAMPLE 18

In a suitable vessel, a mixture of 70 g. of calcium oxide and 210 g. of water was stirred at ambient temperature for 15 minutes to form a slaked lime slurry. A solution of 175 g. of lysine and 1750 g. of water was added to the slaked lime slurry and the resulting mixture was stirred 15 minutes at ambient temperature and then cooled to 5° C. Twenty grams of Hyflo Supercel (filter-aid) was added and the mixture was filtered through 20 g. of Hyflo Supercel. The filtrate was then cooled to 0° C., 1680 g. of ice was added resulting in a mixture containing 0.6% calcium and 4.5% lysine and 37 liters of $CO_2$ was fed into the mixture subsurface with rapid stirring with a precipitate being formed. The resulting mixture was stirred for one hour at −1° C., then warmed to +1° C. and the precipitate was recovered in a basket centrifuge. The resulting cake was slurried in 700 ml. of 0° C. water (12% solids) and the slurry was spray dried at 500° F. inlet temperature, 300° F. outlet.

The resulting product contained 4.5% water, had a reactivity of 55 seconds and retained this reactivity during extended periods of storage.

EXAMPLE 19

In a suitable vessel, a mixture of 75.0 g. of calcium oxide and 225.0 g. of water was stirred at ambient temperature for 15 minutes to form a slaked lime slurry. A solution of 337.5 g. of sucrose and 937.5 g. of water was added to the slaked lime slurry and the resulting mixture was stirred 15 minutes at ambient temperature and then cooled to 5° C. Twenty grams of Dicalite Speed-Plus (filter-aid) was added and the mixture was filtered through 20 g. of Dicalite Speed-Plus. The filtrate containing 3.2% calcium and 21.4% sucrose was then cooled to −2° C. and, with external cooling, 40 liters of $CO_2$ was fed into the mixture subsurface with rapid stirring at such a rate that the temperature did not exceed 0° C. with a precipitate being formed. The resulting mixture was stirred for one hour at 0° C. and the precipitate was recovered in a basket centrifuge. The cake was slurried twice with 1000 ml. quantities of methanol. The solvent was removed after each wash by vacuum filtration. The washed precipitate was air dried for 18 hours at a relative humidity of 15% and a temperature of 24° C.

The resulting product contained about 15.0% water and had a reactivity of 55 seconds which it retained for extended periods of storage.

EXAMPLE 20

In a suitable vessel, a mixture of 382 g. of water, 9.6 g. of CaO and 39.2 g. of sucrose was stirred at 25° C. for 45 minutes, then with ice bath cooling until the temperature of the mixture was 5° C. Five grams of Hyflo Supercel (filter-aid) was added and the mixture was stirred for an additional 5 minutes. The mixture was suction filtered through a filter precoated with Hyflo Supercel. The filtrate was then cooled with stirring to 0° C., 100 g. of ice was added resulting in a mixture containing 1.2% calcium and 7.3% sucrose and 5.5 liters of $CO_2$ was fed into the mixture subsurface with rapid stirring with a precipitate being formed. The resulting mixture was stirred at $-1°$ C. for one hour, then warmed to $+1°$ C. The precipitate was recovered by vacuum filtration and slurried 2 times with 50 g. quantities of 2° C. acetone. The solvent was removed after each wash by vacuum filtration. The washed precipitate was dried in a vacuum oven at less than one mm. for 2 hours at 25° C. and for 18 hours at 70° C.

The resulting product contained 7.5% water and had a reactivity of 50 seconds which it retained during extended periods of storage.

EXAMPLE 21

In a suitable vessel, a mixture of 20 g. CaO and 60 g. water was stirred at ambient temperature for 15 minutes to form a slaked lime slurry. A solution of 22.5 g. glycine and 250 g. water was added to the slaked lime slurry and the resulting mixture was stirred 15 minutes at ambient temperature and then cooled to 5° C. Ten grams of filter-aid was added to the mixture which was then filtered through 10 g. filter-aid. The filtrate was then cooled to 0° C., 240 g. of ice were added resulting in a mixture containing 1.0% calcium and 3.8% glycine and 36 liters of $CO_2$ was fed into the mixture subsurface with rapid stirring with a precipitate being formed. The resulting mixture was stirred for half an hour at $-1.5°$ C., warmed to 0° C. and the precipitate was recovered by vacuum filtration. The precipitate cake was slurried twice with methanol (5 ml./g.) and twice with acetone (5 ml./g.). The precipitate was removed from the solvents each time by vacuum filtration. The washed precipitate was allowed to air dry on the laboratory bench for 18 hours at a relative humidity of 40% and a temperature of 24° C.

The resulting product contained 15.3% water and had a reactivity of 33 seconds but did not retain the reactivity in storage.

EXAMPLE 22

In a suitable vessel, a solution of 34 g. $CaCl_2$, 90 g. sucrose and 310 g. water was cooled to 0° C. and 240 g. of ice was added resulting in a mixture containing 0.18% calcium and 13.4% sucrose. The mixture was stirred rapidly while $CO_2$ was fed subsurface. The pH of the mixture was 7.0 at the beginning of the introduction of $CO_2$ and decreased to 3.5 during the $CO_2$ addition.

No precipitate resulted after 25 minutes of feeding $CO_2$.

EXAMPLE 23

In a suitable vessel, a solution of 34 g. $CaCl_2$, 90 g. sucrose, 210 g. water and 100 g. 1 N NaOH was cooled to 0° C. and 240 g. of ice were added. The resulting mixture containing 0.18% calcium and 13.4% sucrose was stirred rapidly while $CO_2$ was fed subsurface which caused a precipitate to form. The resulting mixture was stirred for one hour at $-1.5°$ C., warmed to 0° C. and the precipitate was recovered by vacuum filtration. The precipitate cake was washed twice with methanol (5 ml./g.) and twice with acetone (5 ml./g.). The precipitate was removed from the solvents each time by vacuum filtration. The washed precipitate was allowed to air dry on the laboratory bench for 18 hours at a relative humidity of 49% and a temperature of 24° C.

The resulting product contained 15.5% water and had a reactivity of 33 seconds but did not retain this reactivity during storage.

EXAMPLE 24

In a suitable vessel, a mixture of 75.0 g. of CaO and 225 g. of water was slurried for 15 minutes at ambient temperature, 1275 g. of water was added and the mixture was cooled to 0° C. To this cold mixture was added 900 g. of ice resulting in a mixture containing 2.2% calcium. With vigorous stirring $CO_2$ was fed into the mixture subsurface until no more was absorbed causing the formation of a precipitate. The resulting mixture was stirred for one hour at 0° C. then warmed to $+1°$ C. The precipitate was recovered by centrifugation. The cake was slurried with 500 ml of 0° C. water and the slurry was spray dried at 500° F. inlet and 300° F. outlet. The reactivity time of the product was 180 seconds and the product contained 5.6% $H_2O$.

This example illustrates the need for the presence of a hydrogen-bonding material in the precipitated calcium carbonate.

EXAMPLE 25

In a suitable vessel, a mixture of 75.0 g. of calcium oxide and 225.0 g. of water was stirred at ambient temperature for 15 minutes to form a slaked lime slurry. A solution of 337.5 g. of sucrose and 1937.5 g. $H_2O$ was added to the slaked lime slurry and the resulting mixture was stirred 15 minutes at ambient temperature and then cooled to 6° C. Twenty grams of filter-aid was added and the mixture was filtered through 20 g. of filter-aid. The filtrate containing 2.0% calcium and 13.2% sucrose was then cooled to 2° C. and $CO_2$ was fed into the mixture subsurface with rapid stirring causing a precipitate to form. The temperature range during $CO_2$ addition was 2°-8° C. The resulting mixture was stirred for one hour at 1° C. and the precipitate was recovered in a basket centrifuge. Much of the precipitate was lost through the filter paper. 100 g. of wet precipitate cake was slurried with about 300 ml. of ice water and spray dried.

The resulting product contained 1.99% water and had a reactivity of 112 seconds.

EXAMPLE 26

In a suitable vessel, a mixture of 75.0 g. of calcium oxide and 225.0 g. of water was stirred at ambient temperature for 15 minutes to form a slaked lime slurry. A solution of 337.5 g. of sucrose and 1937.5 g. $H_2O$ was added to the slaked lime slurry and the resulting mixture was stirred 15 minutes at ambient temperature and then cooled to 11° C. Twenty grams of filter-aid was added and the mixture was filtered through 20 g. of filter-aid. The filtrate containing 2.0% calcium and 13.2% sucrose was then cooled to 8° C. and $CO_2$ was fed into the mixture subsurface with rapid stirring causing a precipitate to form. The temperature range during $CO_2$ addition was 8°-12° C. The resulting mixture was stirred for one hour at 7°-9° C. and the precipitate was recovered in a basket centrifuge. 150 g. of wet precipitate cake was slurried with 300 ml. of ice water and spray dried.

The resulting product contained 1.7% water and had a reactivity of 112 seconds.

EXAMPLE 27

In a suitable vessel, a mixture of 75.0 g. of calcium oxide and 225.0 g. of water was stirred at ambient temperature for 15 minutes to form a slaked lime slurry. A solution of 337.5 g. of sucrose and 1937.5 g. of water was added to the slaked lime slurry and the resulting mixture was stirred for 15 minutes at ambient temperature and then cooled to 15° C. Twenty grams of filter-aid was added and the mixture was filtered through 20 g. of filter-aid. The filtrate containing 2.0% calcium and 13.2% sucrose was then cooled to 12° C. and $CO_2$ was fed into the mixture subsurface with rapid stirring causing a precipitate to form. The temperature range during $CO_2$ addition was 12°–17° C. The resulting mixture was stirred for one hour at 14°–16° C. and the precipitate was recovered in a basket centrifuge. The 140 g. of wet precipitate cake was slurried with 300 ml. of ice water and then spray dried.

The resulting product contained 1.7% water and had a reactivity of 78.5 seconds.

EXAMPLE 28

In a suitable vessel, a mixture of 75.0 g. of calcium oxide and 225.0 g. of water was stirred at ambient temperature for 15 minutes to form a slaked lime slurry. A solution of 3375 g. of sucrose and 1937.5 g. of water was added to the slaked lime slurry and the resulting mixture was stirred 15 minutes at ambient temperature. Twenty grams of filter-aid was added and the mixture was filtered through 20 g. of filter-aid. The filtrate containing 2.0% calcium and 13.2% sucrose was then cooled to 18° C. and $CO_2$ was fed into the mixture subsurface with rapid stirring causing a precipitate to form. The temperature during $CO_2$ addition was 18°–23° C. The resulting mixture was stirred for one hour at 21°–23° C. and the precipitate was recovered by vacuum filtration. 140 g. of wet precipitate cake was slurried with 200 ml. of ice water and spray dried.

The resulting product contained 0.89% water and had a reactivity of 90 seconds.

Examples 25–28 illustrate the generally lower reactivities obtained with precipitates formed at increasingly higher temperatures.

Heretofore, amorphous calcium carbonate has been obtained by some investigators. However, the heretofore obtained amorphous calcium carbonate has rapidly changed from the amorphous state to a crystalline state. In other words, no prior investigator has been able to obtain amorphous calcium carbonate that will remain stable in the amorphous state for significant periods of time (i.e., for periods exceeding about one month). It has now been found that the calcium carbonate provided by this invention is amorphous calcium carbonate that is stabilized in the amorphous state.

It has been found that the stabilized amorphous calcium carbonate prepared by the above described process comprises stabilized amorphous calcium carbonate that contains from about 0.1% to 15% by weight chemically-bound water and a hydrogen-bonding material. Stabilized amorphous calcium carbonate is a fine, white powder. Analyses show that stabilized amorphous calcium carbonate consists of agglomerates of extremely small particles of calcium carbonate that are substantially amorphous. Comparative analysis of stabilized amorphous calcium carbonate show that the particles of calcium carbonate are apparently stabilized in this amorphous state by the presence therein of the proper amount of chemically-bound water and a hydrogen-bonding material.

The analyses of stabilized amorphous calcium carbonate that will be described for illustrative purposes is that material prepared by the procedure of Example 2. For purposes of brevity and for this description this material will be hereinafter referred to as "stabilized amorphous calcium carbonate-2."

Stabilized amorphous calcium carbonate-2 was examined under the electron microscope and was studied by X-ray and infrared analyses.

Examination under the electron microscope reveals the significant difference between stabilized amorphous calcium carbonate-2 and the known crystalline states of calcium carbonate (calcite, aragonite and vaterite). Calcite crystals appear as well-formed cubes uniform in size at a magnification of 4000X. Crystals of vaterite seem to occur as spheres of differing size, while those of aragonite form fairly uniform needles. In contrast, particles of stabilized amorphous calcium carbonate-2 have no distinct size or shape at a magnification of 4000X. Magnified by 20,000X, stabilized amorphous calcium carbonate-2 appears to have a rough surface and non-uniform size suggesting an agglomerate of smaller particles. Photomicrographs were taken at magnifications of 57,000X and 147,000X that show spherical particles with an average particle size of from about 10 A° to about 340 A° at the edge of larger, irregularly-shaped agglomerates.

After determining that the particles of stabilized amorphous calcium carbonate-2 appear different from the known crystalline states of calcium carbonate under an electron microscope, further examination was made by X-ray analysis. Unlike the known crystalline states of calcium carbonate, stabilized amorphous calcium carbonate-2 gives no X-ray pattern at all, that is, stabilized amorphous calcium carbonate-2 is "amorphous" to X-ray analysis. Being "amorphous" to X-ray analysis is due to one of two reasons: either (1) stabilized amorphous calcium carbonate-2 is not a simple carbonate, but a polymeric or hydrogen-bonded species whose repeating units are irregular or too long to be measured by the X-ray analysis, or (2) the particles of stabilized amorphous calcium carbonate-2 are too small to be detected by X-ray analysis.

Infrared analysis supports the second reason for stabilized amorphous calcium carbonate-2 being X-ray amorphous. Infrared spectra were run on two samples of stabilized amorphous calcium carbonate-2 using the CaI pellet technique giving spectra from 4000 cm$^{-1}$ to 200 cm$^{-1}$. One of these samples was combined with an extra 10% ground sucrose so as to intensify the peaks caused by sucrose. Upon comparison of these two spectra the peaks due to sucrose become evident allowing the peaks due to the carbonate group to be isolated. Table I shows the result of this comparison.

That the remaining isolated peaks are due to the carbonate group is confirmed by comparison of those remaining peaks to the spectra obtained using the Nujol mull technique with calcium carbonate prepared without a hydrogen-bonding agent by the procedure of Example 24. Table II shows the results of this comparison.

The remaining isolated peaks were compared to spectra for calcite, aragonite and vaterite obtained in our laboratory on the same instrument. This comparison is shown in Table III which clearly shows that stabilized amorphous calcium carbonate-2 does, in fact, contain a carbonate group but that it does not resemble any one particular morphological state. The basic difference in the spectra of stabilized amorphous calcium carbonate-2 and the other known calcium carbonates is that the peaks of stabilized amorphous calcium carbonate-2 are much broader than those obtained with the other crystalline states of calcium carbonate. Additionally, these spectra show that stabilized amorphous calcium carbonate-2 does, in fact, contain sucrose.

This conclusion as to a carbonate group is further confirmed by comparison of the peaks obtained with stabilized amorphous calcium carbonate-2 with the values for calcium carbonate shown in the literature. These comparisons are shown in Table IV with calcite, Table V with vaterite and Table VI with aragonite.

TABLE I

| Stabilized Amorphous Calcium Carbonate-2 (0% Extra Sugar) (CsI Pellet) Wave Numbers (cm$^{-1}$) | Stabilized Amorphous Calcium Carbonate-2 (10% Extra Sugar) (CsI Pellet) Wave Numbers (cm$^{-1}$) |
|---|---|
| ***3440 | ***°3440 |
| *2940 | *°2940 |
| 2510 (weak) | 2510 |
| 1770 (shoulder) | 1770 (shoulder) |
| **1650 (shoulder) | **1650 (shoulder) |
| 1470 | 1470 |
|  | **1285 |
|  | *1245 |
|  | *1210 |
|  | *1165 (shoulder) |
| *1130 | *°1130 |
| *1070 | *°1070 |
| *995 | *°995 |
|  | *942 |
| *925 |  |
|  | *920 |
|  | *910 |
| 875⎫ | 875⎫ |
|  ⎬(split peak) |  ⎬(split peak) |
| 865⎭ | 865⎭ |
| *700 (broad) | *°700 (broad) |
| *570 (broad) | *°570 (broad) |
| 320 | 320 |

*sucrose,
**water,
***sucrose and water,
°bands with increased intensity
1070 cm$^{-1}$ and 700 cm$^{-1}$ bands are due to both sucrose and the carbonate group.

TABLE II

| Stabilized Amorphous Calcium Carbonate-2 (CsI Pellet) Wave Numbers (cm$^{-1}$) | Calcium Carbonate of Example 24 (Nujol mull) Wave Numbers (cm$^{-1}$) |
|---|---|
| ***3440 |  |
|  | **3400 |
| *2940 |  |
| 2510 (weak) |  |
| 1770 (shoulder) |  |
|  | 1750 |
| **1650 (shoulder) |  |
| 1470 |  |
|  | 1460 |
| *1130 |  |
| *1070 | 1070 |
| *995 |  |
| *925 |  |
| 875⎫ |  |
|  ⎬(split peak) | 867 |
| 865⎭ |  |
| *700 (broad) |  |
| *570 (broad) |  |
| 320 |  |

TABLE III

| Stabilized Amorphous Calcium Carbonate-2 (CsI Pellet) Wave Numbers (cm$^{-1}$) | Calcite (CsI Pellet) | Aragonite (Nujol mull) Wave Numbers (cm$^{-1}$) | Vaterite (CsI pellet) |
|---|---|---|---|
| ***3440 |  |  |  |
| *2940 |  |  |  |
|  | 2520 |  |  |
| 2510 (weak) |  |  | 2510 |
|  |  | 2500 |  |
|  | 1800 |  |  |
|  |  | 1775 |  |
| 1770 (shoulder) |  |  | 1768 |
|  |  |  | 1740 |
| **1650 (shoulder) |  |  |  |
|  |  | 1475 |  |
| 1470 |  |  |  |
|  |  |  | 1465 |
|  | 1445 |  |  |
| *1130 |  |  |  |
|  |  |  | 1090 |
|  |  | 1085 |  |
|  |  |  | 1078 |
| *1070 |  |  |  |
| *995 |  |  |  |
| *925 |  |  |  |
|  |  | 878 |  |
|  |  |  | 877 |
| 875⎫ | 875 |  |  |
|  ⎬(split peak) |  |  |  |
| 865⎭ |  |  |  |
|  | 847 |  |  |
|  |  |  | 744 |
|  |  | 715 |  |
|  | 710 |  |  |
| *700 (broad) |  | 700 |  |
| *570 (broad) |  |  |  |
| 320 |  |  |  |

TABLE IV

| Stabilized Amorphous Calcium Carbonate-2 (CsI Pellet) Wave Numbers (cm$^{-1}$) | Calcite (1) | (2) | (3) | (4) | (5) | (6) Wave Numbers (cm$^{-1}$) |
|---|---|---|---|---|---|---|
| ***3440 |  |  |  |  |  |  |
| *2940 |  |  |  |  |  |  |
| 2510 (weak) |  |  |  |  |  |  |
|  |  |  |  | 1792 |  |  |
| 1770 (shoulder) |  |  |  |  |  |  |
| **1650 (shoulder) |  |  |  |  |  |  |
| 1470 |  |  |  |  |  |  |
|  | 1440 |  |  |  |  |  |
|  |  |  |  | 1432 |  |  |
|  |  |  | 1425 |  |  |  |
|  |  |  |  |  |  | 1419 |
| *1130 |  |  |  |  |  |  |
|  |  |  |  | 1087 |  |  |
|  |  | 1084 |  |  |  |  |
| *1070 |  |  |  |  |  |  |
| *995 |  |  |  |  |  |  |
| *925 |  |  |  |  |  |  |
|  |  |  |  |  | 881 |  |
|  | 877 |  |  |  |  | 877 |
| 875⎫ |  | 874 |  |  |  |  |
|  ⎬ split peak |  |  | 873 |  |  |  |
| 865⎭ |  |  |  |  |  |  |
|  | 847 | 847 |  |  |  |  |
|  | 713 | 713 |  | 712 |  |  |
|  |  |  |  | 710 |  |  |
| *700 (broad) |  |  |  |  |  |  |
| *570 (broad) |  |  |  |  |  |  |
| 320 (broad) |  |  |  |  |  |  |
|  |  |  |  |  |  | 315 (shoulder) |
|  |  |  |  |  |  | 228 (shoulder) |
|  |  |  |  |  |  | 190 (shoulder) |

TABLE IV-continued

| Stabilized Amorphous Calcium Carbonate-2 (CsI Pellet) Wave Numbers (cm$^{-1}$) | Calcite | | | | | |
|---|---|---|---|---|---|---|
| | (1) | (2) | (3) | (4) | (5) | (6) |
| | \multicolumn{6}{c}{Wave Numbers (cm$^{-1}$)} | | | | | |
| | | | | | | 106 (shoulder) |

(1) Miller, F. A. and Wilkins, C. H. Anal. Chem. 22(12), 1253 (1950).
(2) Louisfert, J. and Pobeguin, T., Compt. rend. 235, 287 (1952).
(3) Angino, E. E., Am. Mineral. 52, 137–48 (1967).
(4) Weir, C. E. and Lippincott, E. R., Journal of Research of the National Bureau of Standards A Physics and Chemistry, Vol. 65A, No. 3, May-June 1961, p. 173.
(5) Angino, E. E., Am. Mineral. 52, 137–48 (1967).
(6) Bertin, E. P., Penland, R. B., Mizushima, S., Curran C., and Quagliano, J. V., JACS 81, 3818 (1959).

TABLE V

| Stabilized Amorphous Calcium Carbonate-2 (CsI Pellet) Wave Numbers (cm$^{-1}$) | Vaterite | | | |
|---|---|---|---|---|
| | (1) | (2) | (3) | (4) |
| | \multicolumn{4}{c}{Wave Numbers (cm$^{-1}$)} | | | |
| ***3440 | | | | |
| *2940 | | | | |
| 2510 (weak) | | | | |
| | 1829 | | | |
| 1770 (shoulder) | | | | |
| | 1761 | | | |
| **1650 (shoulder) | | | | |
| | 1488 | | | |
| 1470 | | | | |
| | | | 1450 | 1450 |
| | | 1440 | | |
| | | 1417 | | |
| *1130 | | | | |
| | | | 1090 | |
| | | | | 1089 |
| | | 1088 | | |
| *1070 | 1070 | | | |
| *995 | | | | |
| *925 | | | | |
| | | | 878 | |
| | | | | 877 |
| 875 ⎫ split peak ⎬ 865 ⎭ | 874 | | 873 | |
| | 859 | | | |
| | | 856 | | |
| | | | | 850 |
| | | 747 | | |
| | 745 | | | |
| | | | | 744 |
| | | 741 | | |
| *700 | (broad) | | | |
| *570 (broad) | | | | |
| 320 (broad) | | | | |

(1) Louisfert, J. and Pobeguin, T., Compt. rend. 235,287 (1952)
(2) Baron, G. and Pesneau, M., Compt. rend. 243, 1217 (1956)
(3) Weir, C. E. and Lippincott, E. R., Journal of Research of the National Bureau of Standards A Physics and Chemistry, Vol. 65A, No. 3, May-June 1961, p. 173.
(4) Sterzel, W. and Charinsky, E., Spectrochim. Acta 24A, 353 (1967).

TABLE VI

| Stabilized Amorphous Calcium Carbonate-2 (CsI Pellet) Wave Numbers (cm$^{-1}$) | Aragonite | | | | |
|---|---|---|---|---|---|
| | (1) | (2) | (3) | (4) | (5) |
| | \multicolumn{5}{c}{Wave Numbers (cm$^{-1}$)} | | | | |
| **3440 | | | | | |
| *2940 | | | | | |
| 2510 (weak) | | | | | |
| | | 1774 | | | |
| 1770 (shoulder) | | | | | |
| **1650 (shoulder) | | | | | |
| | | | | 1550 | |
| | | | | | 1511 |
| | | | | | 1489 |
| | | | 1475 | | |
| 1470 | | | | | |
| | | 1440 | | | |
| | | | | 1430 | |
| *1130 | | | | | |
| | | | | 1087 | |
| | | | | | 1083 |
| | | 1080 | 1080 | | |
| *1070 | | | | | |
| *995 | | | | | |
| *925 | | | | | |
| | | 877 | | | |
| 875 ⎫ split peak ⎬ 865 ⎭ | | | | 866 | |
| | 858 | | | | |
| | | 857 | | | 857 |
| | | | 856 | | |
| | 842 | | | | |
| | 745 | | | | |
| | | | | 715 | |
| | 713 | 713 | | | 713 |
| | | | 710 | | |
| | | | | 703 | |
| *700 (broad) | | | | | 700 |
| | | 698 | | | |
| | | | 696 | | |
| *570 (broad) | | | | | |
| 320 (broad) | | | | | |

(1) Murphy, C. B., Anal. Chem. 38(5), 443R-451R (1966).
(2) Louisfert, J. and Pobeguin, T., Compt. rend. 235, 287(1952).
(3) Baron, G. and Pesneau, M., Compt. rend. 243, 1217 (1956).
(4) Weir, C. E. and Lippincott, E. R., Journal of Research of the National Bureau of Standards A Physica and Chemistry, Vol. 65A, No. 3, May-June 1961, p. 173.
(5) Sterzel, W. and Charinsky, E., Spectrochim. Acta 24A, 353 (1967).

Examination by these different analytical methods indicates that stabilized amorphous calcium carbonate-2 comprises extremely small particles of amorphous calcium carbonate. In this sense, stabilized amorphous calcium carbonate is "amorphous" in that it has no crystal lattice that can be identified by available analytical means.

The amorphous state of stabilized amorphous calcium carbonate was further confirmed by refractive index determinations utilizing a Light-Two-Beam, Mach-Zehnder Interference Microscope for transmitted light (Manuf.: Erntz Leitz, Wetzlar, W. Germany). This instrument enables one to determine the refractive indices of solids by the interferometer method.

With this instrument it was found that not only was stabilized amorphous calcium carbonate clearly isotropic but it gave refractive indices that are distinctly different from the refractive indices found with heretofore known amorphous calcium carbonate and known crystalline states of calcium carbonate. For comparative purposes, Table VII gives refractive indices for calcium carbonate materials found in the literature together with the refractive indices found with products made by the procedures of Examples 2, 11 and 16 (mounted in Dow 710 silicone oil with a refractive index of 1.5245).

TABLE VII

| Material | Refractive Indices | | | Literature Reference |
|---|---|---|---|---|
| | $n_\omega$ | $n_\epsilon$ | $n_\gamma$ | |
| calcite | 1.6480 | 1.4820 | — | (1) |
| aragonite | 1.5296 | 1.6804 | 1.6849 | (2) |
| vaterite | 1.5460 | 1.6470 | — | (3) |
| calcium carbonate hexahydrate | 1.460 | 1.535 | 1.545 | (4) |

TABLE VII-continued

| Material | Refractive Indices $n_\omega$ | $n_\epsilon$ | $n_\gamma$ | Literature Reference |
|---|---|---|---|---|
| calcium carbonate monohydrate prior art | 1.590 | 1.543 | — | (5) |
| amorphous calcium carbonate | 1.51–1.53 | — | — | (6) |
| Ex. 2 | 1.5791 | — | — | |
| Ex. 2 (replicate) | 1.5806 | — | — | |
| Ex. 11 | 1.5850 | — | — | |
| Ex. 16 | 1.5830 | — | — | |

(1) Bailly, Am. Mineralogist, 33, 519 (1948).
(2) Yamaguchi, J. Geol. Soc. Tokyo 34, 159 (1927).
(3) Yoshimura, J. Geol. Soc. Tokyo 36, 7 (1929). Gibson, Wyckoff, Merwin, Am. J. of Sci. (5) 10, 325 (1925).
(4) J. Johnston, H. E. Merwin, E. D. Williamson, Am. J. Sci. (4) 41, 473 (1916).
(5) Lippmann, Naturwiss. 46, 553 (1959).
(6) Johnston, Merwin, Williamson, Am. J. Sci. (4) 41, 491 (1916).

From Table VII it can be concluded that no significant difference can be attributed to the products prepared with the hydrogen-bonding materials sorbitol, sucrose or glycine.

As noted before, amorphous calcium carbonate has been reported in several sources [Louisfert, J. et al, Compt. rend. 235, 287 (1952) and Gillott, J. E., J. Appl. Chem. 17, 185 (1967)]. Gillott states that carbonation of $Ca(OH)_2$ may result in the formation of synthetic amorphous calcium carbonate which crystallizes to calcite in the presence of moisture at room temperature. Our experience with amorphous calcium carbonate agrees with Gillott's findings. We have found, however, that stabilized amorphous calcium carbonate is more resistant to calcite crystal formation than previously known amorphous calcium carbonate.

Utilizing stabilized amorphous calcium carbonate as a carbonate factor enables one to prepare effervescent compositions that will rapidly undergo the effervescent reaction upon contact with water and will provide a carbonated beverage that is highly palatable to the consumer. For instance, a typical dry beverage base effervescent composition may comprise a flavor, a sweetener, a color, an acid factor, such as citric acid, and a carbonate factor (in less than the stoichiometric equivalent of the acid factor). When stabilized amorphous calcium carbonate is utilized as the carbonate factor, excellent carbonated beverages result.

Typical effervescent compositions are the well-known effervescent medicament compositions which comprise an acid factor, such as citric acid, medicaments and a carbonate factor. Utilizing stabilized amorphous calcium carbonate as a carbonate factor in the proper proportions, i.e., sufficient to provide the desired $CO_2$ release, in such a composition will provide medicated beverages with improved taste.

Other effervescent compositions illustrating the use of stabilized amorphous calcium carbonate as the carbonate factor (termed "SACC") are shown in Table VIII. Table VIII also shows the volumes of $CO_2$ developed with these effervescent compositions upon contacting them with 178 ml. of water at 40° F.

TABLE VIII

| Ingredient | Composition (wt. grams) | | | |
|---|---|---|---|---|
| | (1) | (2) | (3) | (4) |
| Flavor | 0.08 | 0.08 | — | — |

TABLE VIII-continued

| Ingredient | Composition (wt. grams) | | | |
|---|---|---|---|---|
| | (1) | (2) | (3) | (4) |
| Color | — | — | — | — |
| Sweetener (Synthetic) | 0.09 | 0.09 | — | — |
| Acid Factor (Citric) | 2.60 | 2.70 | 1.74 | 3.30 |
| SACC | 1.70 | 1.45 | 1.30 | 2.40 |
| Sodium bicarbonate | 0.15 | 0.28 | — | — |
| Vol. $CO_2$ developed | 2.3 | 2.3 | 2.4 | 3.0 |

It has been found that excellent sweetened carbonated beverages can be obtained with effervescent compositions containing stabilized amorphous calcium carbonate and the synthetic sweeteners such as, for instance, saccharin, cyclamates, perillaadehyde-aldoxin, dihydrochalcone derivatives, dulcin, steriosid, 5-(3-hydroxyphenyl)-1H-tetrazole and the newly discovered dipeptides as exemplified in U.S. Pat. No. 3,492,131, Belgian Pat. No. 739,543 and West German Pat. No. 1,936,159 and the like.

While the invention has been described herein with regard to certain specific embodiments, it is not so limited. It is to be understood that variations and modifications thereof may be made by those skilled in the art without departing from the spirit and scope of the invention.

The embodiments of the invention in which an exclusive property or privilege is claimed are defined as follows:

1. A dry carbonated beverage concentrate for preparing a carbonated beverage by admixture with water comprising:
   a. amorphous calcium carbonate, substantially devoid of calcium hydroxide, and
   b. an anhydrous, nontoxic acid in an amount in excess of the amount theoretically required to completely evolve the carbon dioxide from the amorphous calcium carbonate.

2. A dry carbonated beverage concentrate according to claim 1 which further includes a flavorant.

3. A dry carbonated beverage concentrate according to claim 1 which further comprises a sweetener.

4. A dry carbonated beverage concentrate according to claim 1 wherein said amorphous calcium carbonate is stabilized amorphous calcium carbonate.

5. A process for preparing a dry carbonated beverage concentrate comprising:
   a. amorphous calcium carbonate, substantially devoid of calcium hydroxide, and
   b. an anhydrous, non-toxic acid in an amount in excess of the amount theoretically required to completely evolve the carbon dioxide from the amorphous calcium carbonate
which process comprises admixing said amorphous calcium carbonate with said anhydrous non-toxic acid.

6. A process according to claim 5 wherein said amorphous calcium carbonate is stabilized amorphous calcium carbonate.

7. A process for preparing a carbonated beverage which comprises admixing water and a dry beverage concentrate comprising:
   a. amorphous calcium carbonate, substantially devoid of calcium hydroxide, and
   b. an anhydrous, non-toxic acid in an amount in excess of the amount theoretically required to completely evolve the carbon dioxide from the amorphous calcium carbonate.

8. A process according to claim 7 wherein said amorphous calcium carbonate is stabilized amorphous calcium carbonate.

* * * * *

UNITED STATES PATENT AND TRADEMARK OFFICE
CERTIFICATE OF CORRECTION

PATENT NO. : 4,237,147
DATED : December 2, 1980
INVENTOR(S) : Helmut L. Merten and Gerald L. Bachman It is certified that error appears in the above-identified patent and that said Letters Patent are hereby corrected as shown below:

Column 1, line 28, "mush" should be -- must --.
Column 4, line 56, "foun" should be -- found --.
Column 6, line 11, "peraures" should be -- peratures --.
Column 6, line 47, "ooserved" should be --observed --.
Column 10, line 52, "This" should be -- The --.
Column 12, line 50, "seconsd" should be -- second --.
Column 12, line 64, "higher" should be -- high --.
Column 13, Example 2, line 6, "oxice" should be -- oxide --.
Column 13, Example 4, line 56, "ft.$^3$min." should be -- ft.$^3$/min. --.
Column 19, Example 15, line 14, "was (first occurrence)" should be -- and --.
Column 24, line 44, "CaI" should be -- CsI --.
Column 26, Table IV, line 63, under column (6), "713" was omitted.
Column 27, Table V, line 47, "(broad)" is under column (1) and should immediately follow "*700".
Column 27, Table VI, line 69, "1440" is under column (2) and should be under column (1).

On The Title Page, "Helmut L. Merten, Ladue" should read Helmut L. Merten, Hudson, Ohio --.

Signed and Sealed this

Thirty-first Day of August 1982

[SEAL]

Attest:

GERALD J. MOSSINGHOFF

Attesting Officer    Commissioner of Patents and Trademarks